No. 793,820.                                         Patented July 4, 1905.

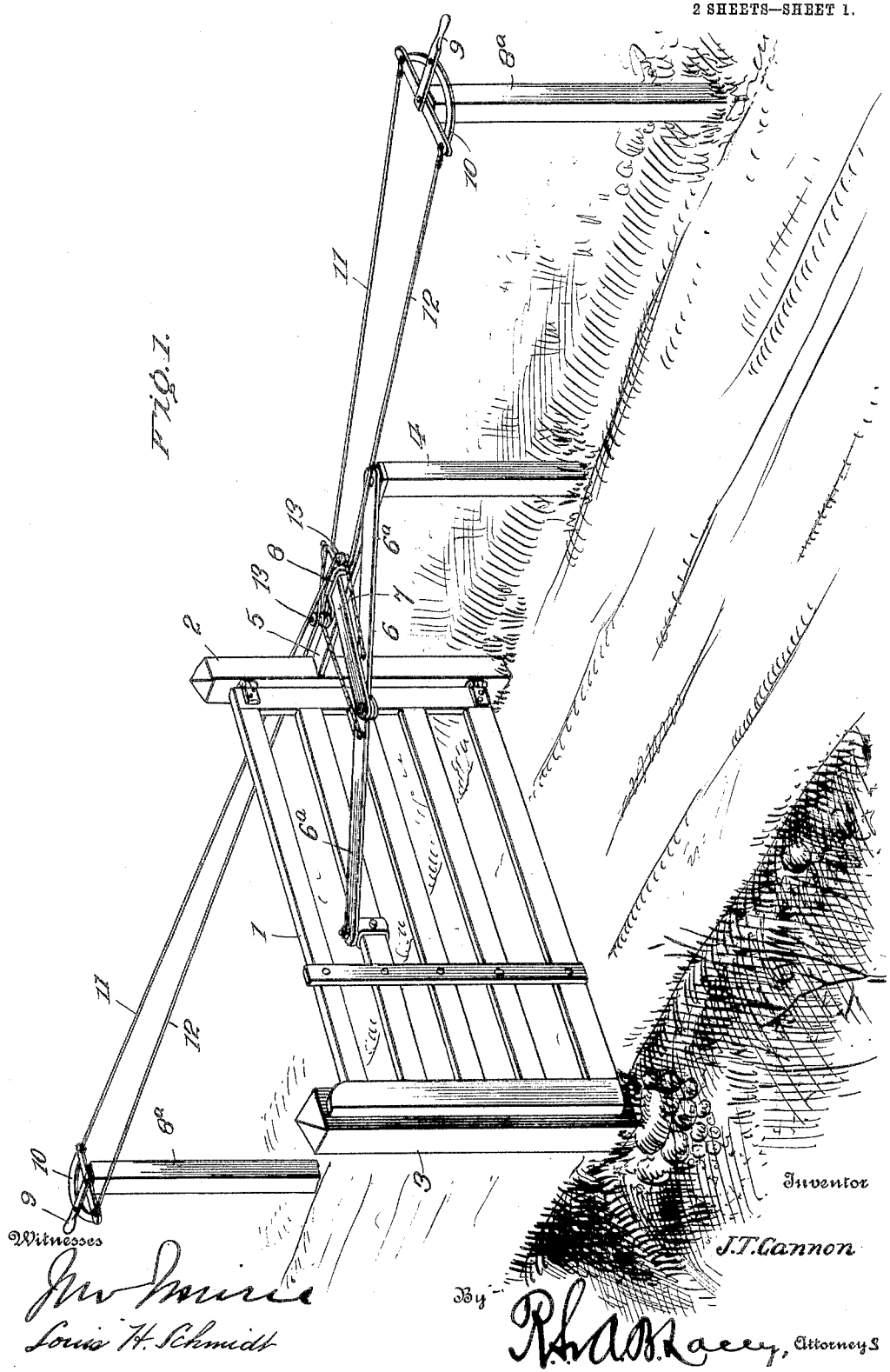

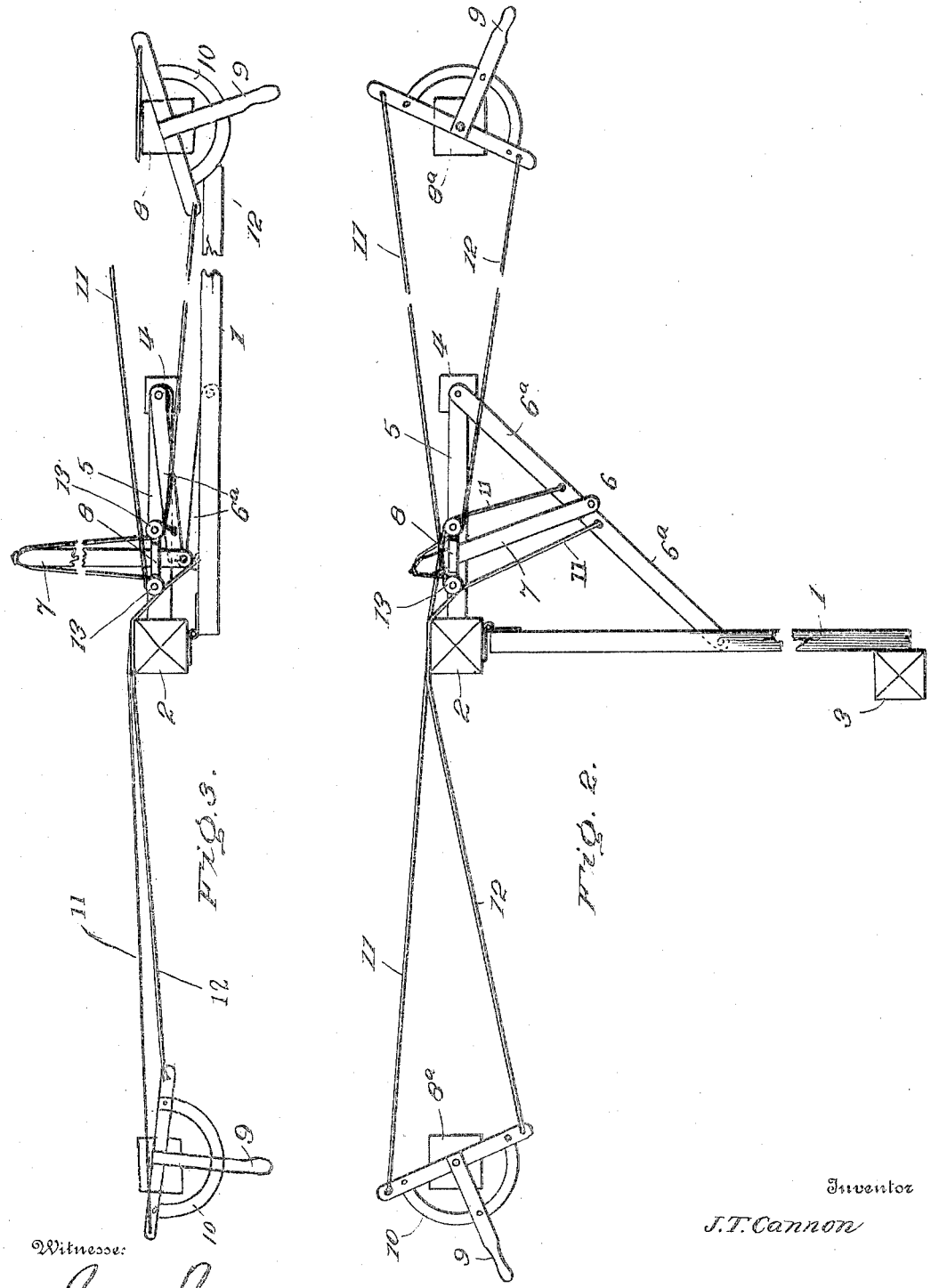

UNITED STATES PATENT OFFICE.

JOHN T. CANNON, OF NEW ATHENS, OHIO.

FARM-GATE.

SPECIFICATION forming part of Letters Patent No. 793,820, dated July 4, 1905.

Application filed March 2, 1905. Serial No. 248,138.

*To all whom it may concern:*

Be it known that I, JOHN T. CANNON, a citizen of the United States, residing at New Athens, in the county of Harrison and State of Ohio, have invented certain new and useful Improvements in Farm-Gates, of which the following is a specification.

This invention relates primarily to improvements in farm-gates, and comprises a novel form of gate-operating mechanism for effecting opening and closing thereof under practical conditions of service. The operating mechanism is adapted to admit of opening and closing the gate by the passer-by approaching from either direction, either when walking or riding in a vehicle.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a perspective view of the invention as when in actual use. Fig. 2 is a plan view, the parts of the operating mechanism being shown in the positions assumed thereby when the gate is closed. Fig. 3 is a view similar to Fig. 2, the gate, however, being shown open.

Corresponding and like parts are referred to in the following description and indicated in all the views of the drawings by the same reference characters.

The gate 1 (illustrated in the drawings) is of the horizontal-swinging type, being hingedly or otherwise mounted upon the usual gate-post 2. The latch-post 3 may be of any suitable type. It will be understood that the construction of the gate is immaterial, as any substantial form of gate may be provided with the operating mechanism constituting this invention.

Describing the arrangement of parts contemplated in the operating mechanism, it is designed to use as a primary actuator for the gate suitable means connected with a toggle connection between the gate and an adjacent support. As shown, the supporting-post 4 is located upon one side of the gate 1, said post supporting the horizontal bar 5. Any equivalent support may be provided instead of the parts 4 and 5, these merely showing a conventional support which may be utilized, if desired. The gate 1 is connected with the bar 5 by a toggle-joint connection. The connection 6 comprises the usual links $6^a$, pivotally connected at one end with the gate 1 and the bar 5, respectively, and with each other at the opposite end. The connection 6 is virtually a break-joint device, and when the links $6^a$ are in alinement the gate is in closed position, the gate being opened by breaking the joint or effecting pivotal movement of the links $6^a$ relative to each other. Various means may be utilized for actuating the toggle connection 6; but it is preferred to utilize the actuating-bar 7, which is pivotally connected with one of the links $6^a$ adjacent the point of connection of said links. The bar 7 is adapted to be actuated so as to break the joint of the connection 6 or throw the links $6^a$ into the alined position to open and close the gate 1, respectively. One end of the bar 7 is connected with the connection 6 and is adapted to slide in the bracket 8 in actuating the links $6^a$, and said bar is operated by means located at some distance from the gate upon the other side thereof.

A short distance from the gate 1 upon opposite sides of the same are located supporting-posts $8^a$, on the upper ends of which are pivoted suitable actuating-levers 9. The levers 9 may be movable horizontally or vertically, being shown in the first-mentioned position. These levers are adapted to actuate segments 10, carried by the posts $8^a$, which segments are directly connected with the parts 7 and 6. Connections 11 are secured at one end to an end of each segment 10, the opposite end of said connections being attached to the toggle connection 6 adjacent the joint thereof. Other connections 12 are connected directly with the other ends of the segments 10 and the actuating-bar 7 near the end of the latter opposite that operably connected with the toggle device 6. The connections 11 and 12 may be wires, cords, or the like, and the same pass about pulleys 13 upon opposite sides of the bracket 8, through which the bar 7 passes.

It will be seen that as the passer-by approaches the gate 1, either walking or in a vehicle, he pulls or pushes lever 9, dependent upon from which side of the gate he approaches in the construction illustrated, so as to actuate the connection 11, which is secured to the toggle device 6. The toggle-joint is thus broken and the gate 1 is thrown open. Having passed through the gate, the passer-by now grasps the lever 9 upon this side and by pivotal movement actuates the connection 12, which operates the bar 7, restoring the toggle-links $6^a$ to alined position, such action forcing the gate 1 into closed position again. The action is just the reverse when approaching from the opposite side of the gate.

It will be noted that the operation of the gate is very simple, and the means utilized may be readily applied to the gates at present in use in a manner which will be apparent.

Barbs or like projecting members may be extended from the toggle members and adjacent parts to prevent stock from brushing thereagainst and breaking or otherwise injuring the operating mechanism.

Having thus described the invention, what is claimed as new is—

1. In combination, a gate, operating mechanism therefor including a suitable support, a toggle connection between the support and the gate, an actuating-bar connected with the toggle connection, means operably connected with the actuating-bar for operating said toggle connection in one direction, and other means directly connected with the toggle connection for actuating the same in the opposite direction.

2. In combination, a swinging gate, operating mechanism therefor including a support at one side of the gate, a toggle connection between the support and the gate, an actuating-bar at one end of the toggle connection and slidably mounted upon the support aforesaid, flexible connections at opposite sides of said gate, said connections each embodying two operating-cords, one of said cords being attached to the actuating-bar, another cord being directly attached to the toggle connection, said connections being adapted to actuate the toggle connection in opposite directions, and pulleys arranged upon the support and having the operating-cords aforesaid passing thereabout.

3. In combination, a swinging gate, operating mechanism therefor including a suitable support, a toggle connection between the support and the gate, an actuating-bar connected with the toggle connection aforesaid for effecting opening and closing of the gate, and means operably connected with the actuating-bar to move the same in opposite directions to effect opening and closing of the gate, such means being located at opposite sides of the gate.

4. In combination, a gate, an operating-lever and support at one side of the gate, a toggle connection between the gate and the support, an operating-bar connected with the toggle connection, a connection between the lever and the operating-bar for opening the gate, and a second connection between the lever and toggle connection for closing the gate.

In testimony whereof I affix my signature in presence of two witnesses.

JOHN T. CANNON. [L. S.]

Witnesses:
 JOHN H. ESTEP,
 JOHN C. ALEXANDER.